Patented June 18, 1940

2,204,932

UNITED STATES PATENT OFFICE 2,204,932

PROCESS FOR PRODUCING DYEINGS

Charles Graenacher, Riehen, Switzerland, assignor to Society of Chemical Industry in Basle, Basel, Switzerland No Drawing. Original application July 5, 1938, Serial No. 217,633. Divided and this application March 14, 1939, Serial No. 261,841. In Switzerland February 10, 1938

4 Claims. (Cl. 8—49)

This application is a division of patent Serial No. 217,633 filed in U. S. A. On July 5, 1938, and in Switzerland on February 10, 1938.

In U. S. Patents Nos. 2,095,600 and 2,120,741 and in the U. S. patent applications Serial No. 92,244, filed July 23, 1936 and Serial No. 173,528, filed November 8, 1937, there are described water soluble acyl derivatives of sparingly soluble dyestuffs which contain in the acyl residue groups determining water-solubility. In the said pecification it is explained how such derivatives may be used for producing dyeings by treating them on the substratum, for instance vegetable fiber, with a saponifying agent.

It has now been found that quite generally a certain difficulty consists therein that such easily soluble acyl derivatives can be more or less dissolved from the fiber during the saponification. This is particularly the case if the affinity of the new ester-like derivatives for the substrata is not very pronounced. Whereas this affinity is rather pronounced in certain substrata such as textiles of animal origin, for example wool or silk, it is smaller with substrata of vegetable origin, for example textiles from cellulose (this term comprising both regenerated and native cellulose). In such cases it is necessary to conduct the treatment with the saponifying agents under more energetic conditions with regard to the hydroxyl ion concentration of the saponifying liquid. Thus it is avoided that, preceding the saponification, the water-soluble salts of the ester-like products are dissolved in part from the fibre by the treating liquor. Apart from the fact that such a method of working does not always lead to quite satisfactory results, there is a disadvantage if the substratum or the final dyestuff is sensitive to caustic alkali.

It has now been found that by the selection of suitable conditions it is possible to reduce the dissolution of the water-soluble acyl derivatives from the substratum previously to their saponification to a minimum, so that with regard to the duration of the saponification and the hydroxyl ion concentration of the saponifying liquid one is in a position to select for the saponification the most favorable conditions with respect to the substratum, sensitiveness to alkali of the dyestuffs, and the apparatuses. These conditions exist for example when carrying out the operation in the presence of water-soluble salts which reduce the solubility of the ester-like products on the fiber, either by applying them in greater quantities or by converting the ester-like product into sparingly soluble salts by double reaction.

In the former case there may be used salts such as sodium chloride or sodium sulfate, ammonium chloride, potassium chloride, potassium sulfate, ammonium sulfate or magnesium chloride (the latter preferably in the presence of ammonium salts such as ammonium chloride). Such salts may simultaneously also be used as saponifying agents, this is the case if salts having an alkaline reaction are used, such as for example alkali phosphates or alkali carbonates.

In the latter case it is advantageous to use barium chloride, calcium chloride, barium nitrate, zinc chloride, aluminium sulfate and the like. This manner of working is the subject matter of my copending applications Serial No. 217,633, filed July 5, 1938, and Serial No. 261,842, filed March 14, 1939, the examples of which are also to be taken into consideration when judging the scope of the disclosure of the present divisional application.

The subject matter of the present application consists in working in such a manner that the use of a bath in the treatment with the saponifying agents is avoided. This may be brought about by a treatment with basic vapors such as ammonia gas or organic amines in the form of vapor.

The process of the invention is not only applicable to the products of the aforesaid U. S. patents. It may be used quite generally for water-soluble acyl derivatives of sparingly soluble dyestuffs which contain in the acyl residue a group determining solubility in water (for instance, the products of the U. S. patent application Serial No. 173,528, filed November 8, 1937. It is suitable both for dyeing in the narrower sense and for printing.

The following examples illustrate the invention:

Example 1

5 parts by weight of the product of the action of benzoic acid mono-sulfochloride on the azo dyestuff from diazotized monobenzoyl-2:5-diaminohydroquinone-diethyl ether and 2:3-hydroxynaphthoic acid anilide, 30 parts of water, 50 parts of starch tragacanth thickening and 15 parts of thiodiglycol are mixed to form a printing paste. This is printed on a fabric which may consist of cotton, artificial silk from regenerated cellulose, natural silk, wool, or of a mixture of such fibers and the latter is dried. After steaming for 5–8 minutes in the Mather-Platt apparatus the fabric is subjected at 80–100° C. for 3–5 minutes to a moist atmosphere containing ammonia and is then rinsed, and soaped. There is obtained a fast intensely blue print.

Yellow prints are produced if in the printing color there is substituted 8 parts by weight of the product of the action of benzoic acid monosulfochloride on the ternary condensation product from 1 mol of cyanuric chloride, 2 mols of α-aminoanthraquinone and 1 mol of aniline, for the 5 parts by weight of the product of the action of benzoic acid mono-sulfochloride named above.

*Example 2*

The following printing paste is prepared:

| | Grams |
|---|---|
| The product of the action of benzoic acid sulfochloride on the azo dyestuff from diazotized 2:5-dichloraniline and the ortho-anisidide of 2:3-hydroxynaphthoic acid | 80 |
| Water | 170 |
| Urea | 100 |
| Thiodiglycol | 150 |
| Neutral starch tragacanth thickening | 500 |
| | 1000 |

This paste is printed on viscose artificial silk fabric, which is then dried, treated in the Mather-Platt apparatus for 5–10 minutes and drawn in the course of 5–10 minutes through a moist chamber containing ammonia gas at 30–40° C. After washing and soaping there is obtained an intense fast scarlet red print.

A like result is obtained if the steamed fabric is exposed at room temperature for some time to an atmosphere of ammonia.

*Example 3*

The following printing paste is prepared:

| | Grams |
|---|---|
| The product of the action of meta-benzoic acid sulfochloride on the azo dyestuff from diazotized meta-chloraniline and the anilide of 2:3-hydroxynaphthoic acid | 80 |
| Water | 270 |
| Thiodiglycol | 150 |
| Neutral starch tragacanth thickening | 500 |
| | 1000 |

After printing this paste on a cotton fabric, the latter is dried, steamed for 5–10 minutes in the Mather-Platt apparatus and then drawn through an atmosphere of steam containing ethylenediamine at 100° C. in the course of 3–5 minutes. The fabric is then rinsed and soaped; the print is a fast orange.

Similar results are obtained if other volatile organic bases, such as ethylamine, diethylamine, triethylamine, propylamine or the like are added to the steam.

*Example 4*

The following two printing pastes are prepared:

(a)

| | Grams |
|---|---|
| The product of the action of meta-benzoic acid sulfochloride on the azo dyestuff from diazotized 4:4-dichloro-2-amino-1:1-diphenyl ether and the ortho anisidide of 2:3-hydroxynaphthoic acid | 80 |
| Water | 270 |
| Thiodiglycol | 150 |
| Neutral starch tragacanth thickening | 500 |
| | 1000 |

(b)

| | Grams |
|---|---|
| Cibanone Green G double paste (Color index No. 1172) | 150 |
| Potash thickening | 650 |
| Sodium sulfoxylate formaldehyde | 80 |
| Urea | 80 |
| Water | 40 |
| | 1000 |

The two pastes are simultaneously printed on cotton and the fabric is dried, treated in the Mather-Platt apparatus for 5–10 minutes and then drawn in the course of 5–10 minutes at 30–40° C. through a moist atmosphere containing ammonia. It is then rinsed, soured if necessary, again washed and soaped at the boil.

There is obtained a very fast brilliant green-red two-color print.

What I claim is:

1. Process for producing dyeings by means of water-soluble acyl derivatives of sparingly soluble dyestuffs which contain in the acyl radical the group lending solubility in water by treating such acyl derivatives on substrata with saponifying agents, comprising effecting the saponification by treatment with saponifying agents in the form of vapor.

2. Process for producing dyeings on cellulose by means of water-soluble acyl derivatives of sparingly soluble dyestuffs which contain in the acyl radical the group lending solubility in water by treating such acyl derivatives on cellulose with saponifying agents, comprising effecting the saponification by treatment with saponifying agents in the form of vapor.

3. Process for producing dyeings by means of water-soluble acyl derivatives of sparingly soluble dyestuffs which contain in the acyl radical the group lending solubility in water by treating such acyl derivatives on substrata with saponifying agents, comprising effecting the saponification by treatment with ammonia vapors.

4. Process for producing dyeings on cellulose by means of water-soluble acyl derivatives of sparingly soluble dyestuffs which contain in the acyl radical the group lending solubility in water by treating such acyl derivatives on cellulose with saponifying agents, comprising effecting the saponification by treatment with ammonia vapors.

CHARLES GRAENACHER.